Figure 1:
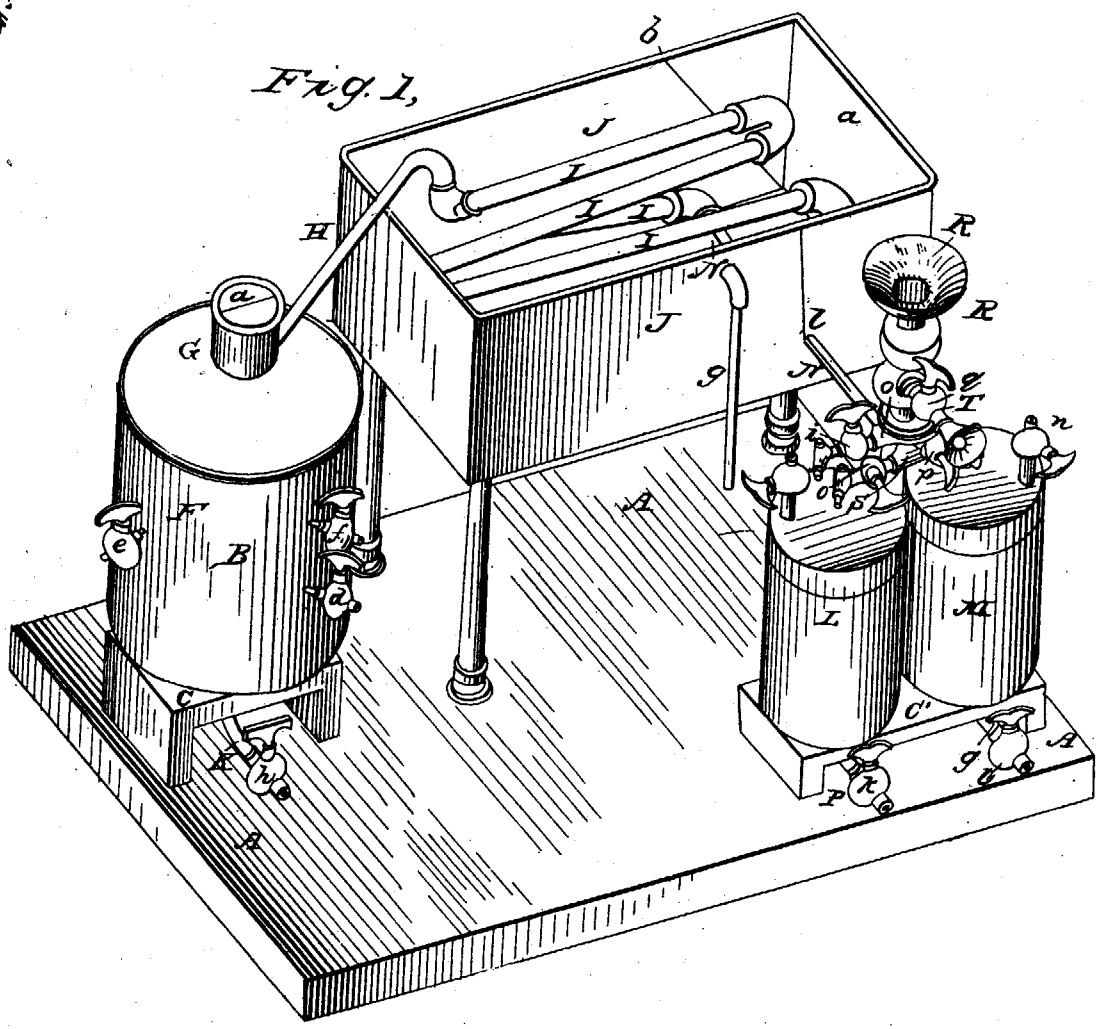

H. W. C. TWEDDLE.

2 Sheets—Sheet 1.

Oil Still.

No. 2,404.

Reissued Nov. 27, 1866.

Witnesses:
Ashmead Ansley
H. Spratt

Inventor
Herbert W. Tweddle

H. W. C. TWEDDLE.
2 Sheets—Sheet 2.
Oil Still.
No. 2,404.
Reissued Nov. 27, 1866.
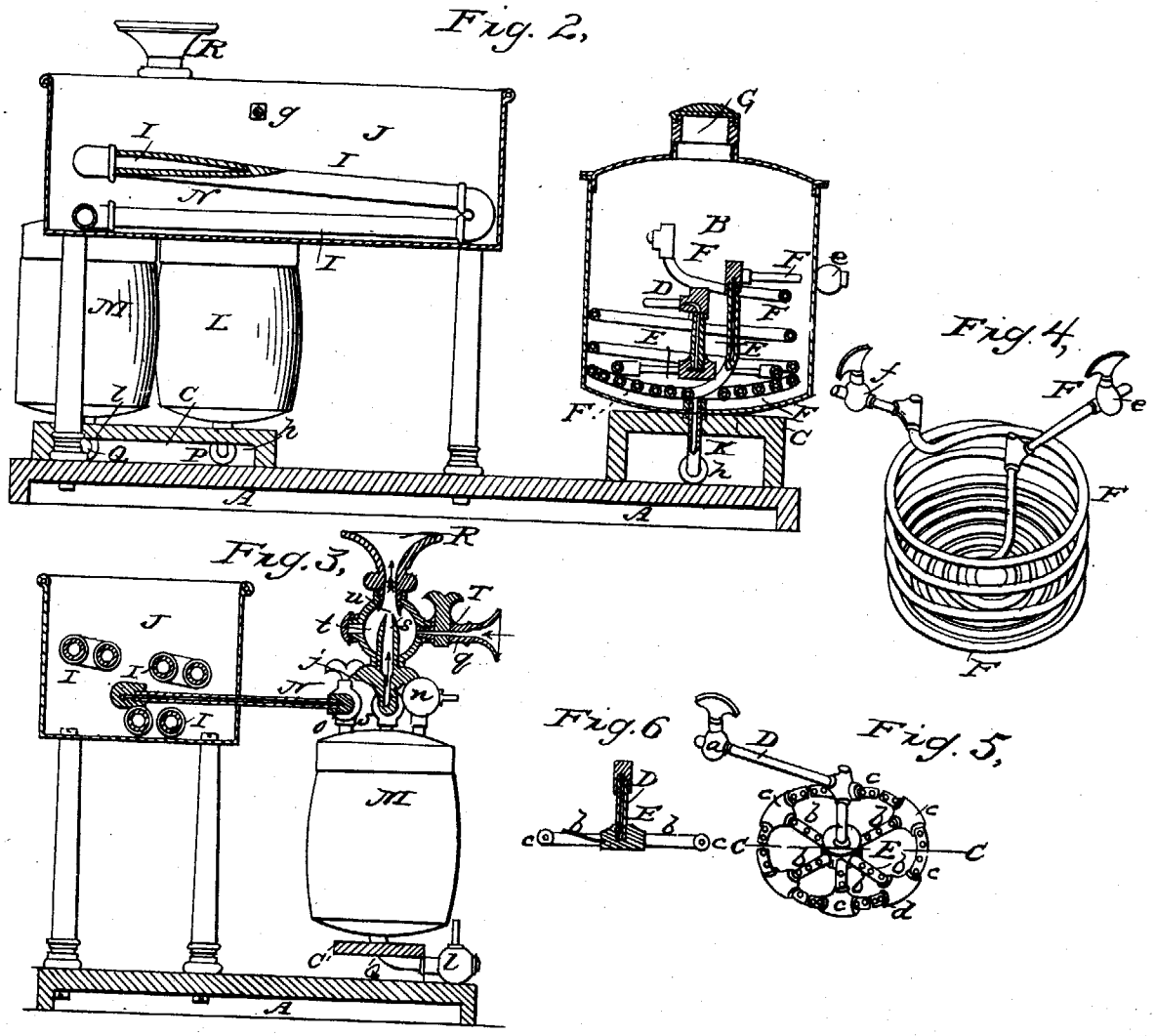
Witnesses.
John H. Bailey
H. Spinks.
Inventor.
Herbert W. C. Tweddle

UNITED STATES PATENT OFFICE.

HERBERT W. C. TWEDDLE, OF PITTSBURG, PENNSYLVANIA.

IMPROVED APPARATUS FOR DISTILLING COAL-OIL AND OTHER SUBSTANCES.

Specification forming part of Letters Patent No. 34,324, dated February 4, 1862; Reissue No. 2,404, dated November 27, 1866.

*To all whom it may concern:*

Be it known that I, HERBERT W. C. TWEDDLE, a citizen of England, and resident of Pittsburg, in the State of Pennsylvania, have invented a new and useful Improvement in the Process of Distillation of Petroleum and other hydrocarbon oils or fats of any description; and I do hereby declare that the following is a full, clear, and exact description of my said invention, and of the apparatus which I employ in its practical application.

My invention consists in distilling petroleum and other hydrocarbon oils and fats under a vacuum or partial vacuum, in combination with the use of steam for producing the vaporization of the article to be distilled; also, in the use of superheated steam for distilling hydrocarbon oils and fats under a vacuum or partial vacuum.

The principal objects of my invention are to conduct the operation of distillation at a lower and more uniform degree of heat than is required by the ordinary modes of distillation, and to remove the danger arising from the direct application of fire to the stills containing the oil to be distilled.

In the distillation of petroleum by means of fire applied to the stills, the heat requires to be run up to from 530° to 580° Fahrenheit, in order to distill over the heavy products at the latter part of the operation. Such a high heat injures the stills and causes them to leak, and many serious accidents have occurred from this and other causes incident to the proximity of fire to these highly-inflammable oils and the gases generated therefrom in the process of distillation. It is also very difficult to regulate the heat of a furnace so as to carry on the distillation to the best advantage, and the consequence is, that a large amount of oil is lost by the destructive distillation of the oil and the formation of permanent gas.

If the process of distillation is carried on under a vacuum or partial vacuum, the heat required is considerably less, being only about 380° Fahrenheit in cases where 580° would be required without the vacuum.

To obtain the degree of heat (say 380° Fahrenheit) required at the latter stages of the process of distillation by the use of steam, it is necessary to have a pressure of about two hundred pounds to the square inch in the steam-generator, which is fraught with danger, and is liable to injure the steam-pipes and still, and cause leakage. Thus, although the heat produced by steam is much more beneficial, so far as the effect on the distillate is concerned, the difficulty and danger attending the production of the high temperature required at the latter part of the operation, even if a vacuum is created in the still, renders its adoption in this way unadvisable. By superheating the steam, however, this difficulty is effectually surmounted, because much less pressure is required, so that by the use of superheated steam, in combination with a vacuum or partial vacuum, I am enabled to distill over the heavy products of distillation of petroleum and other oils, and at the same time avoid, in a great degree, the decomposition of the oils into non-condensable gas and the elimination of solid carbon in the shape of coke or tarry residuum, which is deposited in the bottom of the stills when fire heat is employed.

The apparatus employed may be variously constructed and arranged, and the vacuum may be produced by means of an air-pump, water-column, or by means of the device hereinafter described.

To enable others skilled in the art to make use of my invention, I will proceed to describe the apparatus which I use for this purpose, referring to the accompanying drawings, forming part of this specification, in which—

Figure 1 is a perspective representation of my apparatus. Fig. 2 is a longitudinal sectional elevation through the line *x x* in Fig. 1. Fig. 3 is a transverse sectional elevation through the line *z z* in Fig. 1. Fig. 4 is a perspective representation of the coil of steam-pipe detached from the still. Fig. 5 is a perspective view of the distributer. Fig. 6 is a vertical section through the line *x x*, Fig. 5.

Like letters refer to the same parts in all the figures.

In the drawings, A is the foundation or base, on which the apparatus is set. B is the still, which may be of any desired shape, set on a raised pedestal, C, to allow of the insertion of the waste-pipe K into the bottom of the still, for emptying it when desired, and removing any residuum which may be deposited in the still during the process of distillation. The waste-pipe K is opened or closed by a stop-cock, *h*. The still is supplied with oil to be heated through the supply-pipe D, which is furnished with a stop-cock, *a*, to open or close the connection of the still with a reservoir of oil placed in any convenient position, and with which the pipe D is connected. E is a distributer for the superheated steam, consisting of a central pipe and radial arms *b b*, and a rim composed of segments of an annular pipe, *c c*, attached to the extremities of the radial arms *b b*. The radial arms *b b* and rim-pieces *c c* are perforated with small holes *d d*, to insure an equal distribution of superheated steam in the interior of the still. From the dome G of the still B a goose-neck or pipe, H, conducts the products of distillation to the coil of condensing-pipes I I, placed in a refrigerator or cold-water tank, J, into which tank a stream of cold water is continually running, an overflow-pipe, *g*, being inserted into the side of the tank J, above the level of the pipes I I, so as to keep them submerged in the cold water. The lower end of the coil of condensing-pipes I I (farthest from the still) connects with a pipe, N, which opens into a short branch pipe, O, one end of which enters the top of the receiver L, and the other end enters the top of the receiver M, the stop-cocks *i* and *j* serving to connect or disconnect either of the receivers L and M with the flow-pipe N. By this arrangement the distilled oil runs into one or other of the two receivers L and M, as may be desired. The receivers L and M may be placed side by side on a stand, C′, and the pipes P and Q, furnished with cocks *k* and *l*, respectively, serve to draw off the distilled oil from the receivers.

Fig. 4 represents a coil of pipe, F, inserted in the still B, as shown in Fig. 2, so as to be covered by the oil to be distilled. This coil is heated by steam introduced through the cock *e* at one end of the pipe, and passing out when necessary at the blow-pipe *f*, at the other extremity.

The device which I employ for producing a vacuum or partial vacuum in the receivers is shown in Figs. 1 and 3. Connecting the two receivers L and M is a short pipe, S, opening at one end into the receiver L, and at the other end into the receiver M, furnished with stop-cocks *o* and *p*, by opening and closing which the vacuum apparatus is connected with one or other of the receivers, at pleasure. On the branch pipe S, between the stop-cocks *o* and *p*, is placed a short vertical pipe, *s*, which opens into the pipe S at its lower end. This pipe *s* is surrounded by a hollow globe, *t*, so that the extremity of the pipe *s*, which is slightly tapering upward, is situated in the cavity of the globe, above its center. On top of the globe *t* is a funnel, R, the lower end of which enters the cavity of the globe *t*, the mouth of the funnel at its lower end, at *v*, flaring outward slightly, as seen in Fig. 3, and extending down to and immediately over the top of the pipe *s*. On one side of the globe *t* is a pipe, T, for admitting live steam into the cavity of the globe, which pipe is furnished with a stop-cock, *q*, for shutting off the steam when the vacuum apparatus is not required to be in operation.

When steam is admitted through the pipe T into the vacuum-globe *t*, it rushes up through the funnel R, all around the mouth of the upright pipe *s*, with so much force as to draw out the air or gaseous contents of the branch pipe S, and also from whichever of the receivers L or M may be in connection with it. This also produces a vacuum through the condensing-pipes I I, which are connected by the pipe N with the same receiver, L or M, that is in connection with the vacuum apparatus, and also in the still B. Air-cocks *m* and *n* are placed one on top of each of the receivers L and M, to admit the atmospheric air into the receivers whenever it is desired to destroy the vacuum, for the purpose of checking the distillation or of drawing off the distilled oil from the receivers.

The operation of my apparatus is as follows: When the still is charged with oil to be distilled, and one of the receivers L or M, being empty, is connected, by opening the cocks, with the branch pipe O and condensing-coils I I, steam at from 80° to 120° Fahrenheit is admitted into the coil F to vaporize the oil in the still B. At the same time the vacuum apparatus is connected with the receiver which is in use, (which is disconnected from the other,) and steam is admitted through the pipe T, which produces a vacuum (more or less perfect) through the receiver, refrigerator, and still. By means of the withdrawal or reduction of the atmospheric pressure thus effected, the distillation progresses very rapidly at a low temperature compared to that which would otherwise be required.

When all the oil is distilled which will pass over at the heat first employed, I increase the temperature up to about one hundred and twenty pounds pressure to the square inch, after which I commence to use superheated steam, by which means I can safely attain any degree of heat which is requisite to distill the heavier oils remaining undistilled at the degree of heat previously employed.

The steam may be superheated in any ordinary manner. The coil F may be used for heating the oil with steam up to distilling temperature, and afterward the steam-distributer E, for carrying on the distillation, or either of them alone, may be used, as may be preferred.

When either of the receivers, N or M, is filled, its connection with the still and with the vacuum apparatus is shut off, and the other receiver is put in connection with the apparatus, so that the filled receiver may be emptied without stopping the operation.

In addition to the advantages already stated as resulting from my improvement, the oil resulting from distillation by the process described is almost entirely devoid of the acrid and unpleasant odor of fire-distilled oils, and is almost colorless. The quantity of illuminating-oil thus produced from a given amount of crude petroleum is greater by from twelve to fifteen per cent. by my process.

My apparatus will last much longer than stills to which fire heat is directly applied. There is much less danger of leakage, as the vacuum causes pressure on the pipes from outside; and the frequent stoppage of the works, caused by the burning of the stills where fire is used, is entirely obviated. It is also a great advantage, incident to the dispensing with the use of fire under the stills, that the products of distillation may be safely discharged at a point near to the stills, so that the whole apparatus can be compactly located, and be all under the eye of the workman.

Having thus described my improvement, what I claim as my invention, and desire to secure by Letters Patent, is—

1. Distilling hydrocarbon oils, such as petroleum and other substances, under a vacuum, or partial vacuum, by the use of steam, for producing the vaporization of the article to be distilled.

2. The use of superheated steam, in combination with the employment of a vacuum or partial vacuum, for the distillation of petroleum and other hydrocarbon oils, and similar substances.

3. The combination of a steam vacuum apparatus, constructed substantially as hereinbefore described, with the oil-receivers L and M, for the purpose hereinbefore described.

4. The combination of the vacuum apparatus hereinbefore described with the steam pipe or pipes in the interior of the still, and with the still, for the purposes hereinbefore described.

In testimony whereof I, the said HERBERT W. C. TWEDDLE, have hereunto set my hand.

HERBERT W. C. TWEDDLE.

Witnesses:

A. S. NICHOLSON,

GEORGE H. CHRISTY.